March 3, 1964  W. WRIGLEY ETAL  3,122,842
GYROCOMPASS
Filed Nov. 27, 1951  5 Sheets-Sheet 1

INVENTORS
WALTER WRIGLEY
CHARLES S. DRAPER

ATTORNEY

March 3, 1964  W. WRIGLEY ETAL  3,122,842
GYROCOMPASS

Filed Nov. 27, 1951  5 Sheets-Sheet 4

Fig. 7

INVENTORS
WALTER WRIGLEY
CHARLES S. DRAPER

BY
ATTORNEYS

Fig. 8

United States Patent Office 3,122,842
Patented Mar. 3, 1964

3,122,842
GYROCOMPASS
Walter Wrigley, Wollaston, and Charles S. Draper, Newton, Mass., assignors, by mesne assignments, to Massachusetts Institute of Technology, a corporation of Massachusetts
Filed Nov. 27, 1951, Ser. No. 258,416
15 Claims. (Cl. 33—226)

The present invention relates to gyroscopic apparatus and more particularly to gyrocompasses.

In the conventional gyrocompass, two-degree-of-freedom gyroscopes are used. Generally, the gyro is hung as a pendulum and a pendulum deflector with an 84-minute period is added to give the instrument its north-seeking property under normal operating conditions. On ship it is also convenient and often necessary to indicate an accurate vertical as in navigational and firecontrol applications. This has generally been done by using on the gyrocompass (which, when pointing north, is horizontal) an indicator system to give an indicated vertical. In such a system two sets of difficulties arise. The first set comes from the use of a two-degree-of-freedom gyro. Its gimbals should be frictionless and perfectly balanced, but since these conditions can never be achieved in practice, compensating torques must be used. These compensating torques cannot be applied directly, but must be introduced in such a fashion as to cause complicated erecting movements. There are also problems of gimbal lock, which again require the addition of complex compensating apparatus.

The second set of difficulties are theoretical problems associated with the use of a two-degree-of-freedom gyro. A gyrocompass cannot be built unless the gyro is held in a fixed relationship to a horizontal plane. In the conventional gyrocompass, one of the degrees of freedom is used to find north and one to maintain a vertical. There is only one detector for the system and therefore the system loop for the north-seeking property is the same as that for the vertical-seeking property. Thus, the vertical-indicating system is dependent on the north-seeking system, and the apparatus is not satisfactory in certain cases where it is necessary to know the vertical (as for navigational purposes) independently of any errors in direction.

The principal object of the present invention is to provide a gyroscopic compass which is of especially simple and accurate, yet rugged construction.

Another object of the present invention is to provide a gyrocompass in which the vertical-seeking loop and the direction-seeking loop need not be the same loop but can be two coupled loops which are independently controlled.

Still another object of the present invention is to provide in one unit a means for indicating the vertical and indicating north with greater accuracy than has been heretofore obtained.

In furtherance of these objects, the principal feature of the invention comprises a single-degree-of-freedom gyroscope, sensitive to a component of the earth's rotational velocity when its input axis is deflected from the east-west direction, together with drive means responsive to such deflection tending to restore the gyro to a null-position with respect to the east-west direction. By this means, geographical directions are accurately indicated.

Another feature of certain embodiments of the present invention is the use of separate single-degree-of-freedom gyroscope units for the vertical stabilizing system and the direction-seeking system, whereby the vertical stabilizing system and the direction-seeking system may be independently controlled.

The present invention preferably utilizes integrating gyro units as described in the copending application of Jarosh, Haskell and Dunnell, Serial No. 210,246, filed February 9, 1951, now Patent No. 2,752,791, dated July 3, 1956. Such units can be used in a vertical stabilization system as shown in the copending Draper and Woodbury application, Serial No. 216,947, filed March 22, 1951, now Patent No. 2,752,792, and can also be connected so as to form the direction-seeking velocity detecting device which forms one of the principal features of the invention.

In the accompanying drawings.

Figure 6:
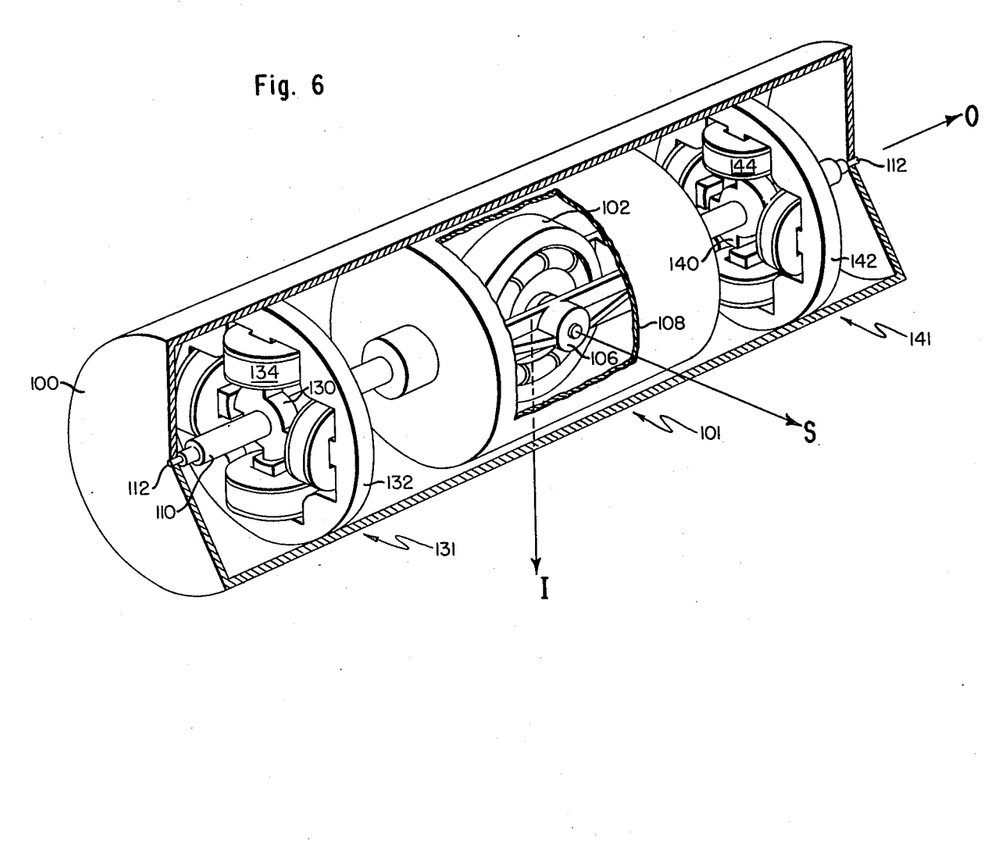
FIG. 6 is a schematic drawing of a gyro unit which may be used in the present invention.

FIG. 6 will be referred to first to show the operation of a single-degree-of-freedom gyroscope. A gyro rotor 102 is mounted to spin in a frame 106 which is mounted rigidly on a rotatable shaft 110. The shaft is supported in a case 100 in bearings 112. The axis of rotor spin is denoted S; the axis of the shaft 110 is the output axis O. The gyroscope has only one degree of freedom, that is, it can rotate with respect to its support (the case 100) only about the axis O. It is well-known that twisting a gyro about one axis generates a precession torque which causes the gyro to rotate about an axis perpendicular to the first axis and the spin axis. Therefore, the only motion of the case 100 which causes the gyro to rotate the frame and shaft within the case is motion about the input axis I, perpendicular to the spin and output axes.

The relation between the motion about the axis I and the gyro deflection O is determined by the type of resistance given to the gyro deflection. This is explained in more detail below. It suffices to say here that if a viscous force is used, that is, a force proportional to the rate of gyro deflection, the amount of output rotation is proportional to the amount of input rotation. If a spring force, that is, a force proportional to the amount of gyro deflection, is used to resist the deflection, the amount of output rotation is proportional to the velocity of rotation of the case 100 about the input axis I.

Therefore, the amount of gyro deflection is a measure of the input motion. In order to detect the amount of gyro deflection or output rotation, a signal generator 131 may be provided to generate an electric signal proportional to the deflection of the shaft 110 with respect to the case 100. The signal generator is preferably of the type described in the Mueller Patent No. 2,488,734, issued November 22, 1949. It comprises a rotor 130 mounted on the shaft 110, and a stator 132 and stator windings 134 mounted on the case 100. When a reference voltage is applied to the windings, the signal generator generates a voltage proportional to the deflection of its rotor from some null position with respect to the stator.

Figure 1:
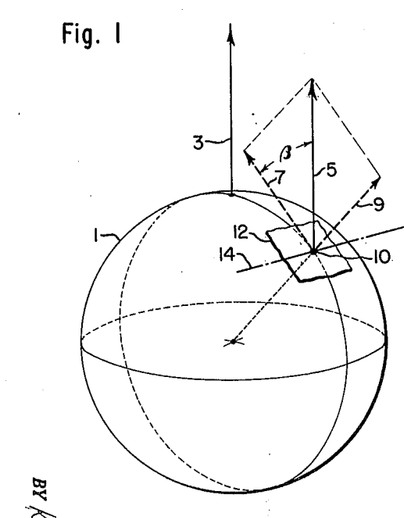
FIGS. 1 and 2 are schematic drawings to illustrate the direction-sensitive property utilized in the present invention.

Referring to FIG. 1, we will now explain the operational principle of our invention. In FIG. 1 the earth is shown at 1 with the vector representing its angular velocity at 3. This velocity will be present at any point on the earth's surface, as is shown by drawing a parallel vector 5 at the point 10. This vector, being parallel to the polar axis of the earth, will lie in the plane of the meridian. It may be resolved into components in that plane, namely, along a vertical line 9 at point 10 and a horizontal line 7 at point 10. The horizontal line 7 will be the north-south direction; perpendicular to it is the line 14, also horizontal, representing the east-west direction. Since this line is perpendicular to the earth rotation vector 5, no component of the earth's rotation lies along that line. This is simply to say that, at any point on the earth's surface no component of the earth's rotational velocity lies in the east-west direction.

The present invention provides a velocity-detecting means at the point 10, having an axis lying in the horizontal plane 12 and means causing it to seek out a condition where it senses no velocity about said axis; it therefore seeks out the east-west direction (line 14) at any point on the earth's surface.

The velocity-detecting means of the present invention is a single-degree-of-freedom gyroscope. An input velocity to the gyroscope about its input axis causes it to generate a gyrostatic torque proportional to the velocity. Means are provided for generating a resisting torque which is equal and opposite to the gyrostatic torque. A balance is detected and the resisting torque is measured, thus providing a measure of the input velocity. This measurement acts as an error signal to move the gyroscope until the resisting torque, and therefore the gyrostatic torque, are zero, and then the input axis of the gyroscope is lined up to east.

Figure 2:
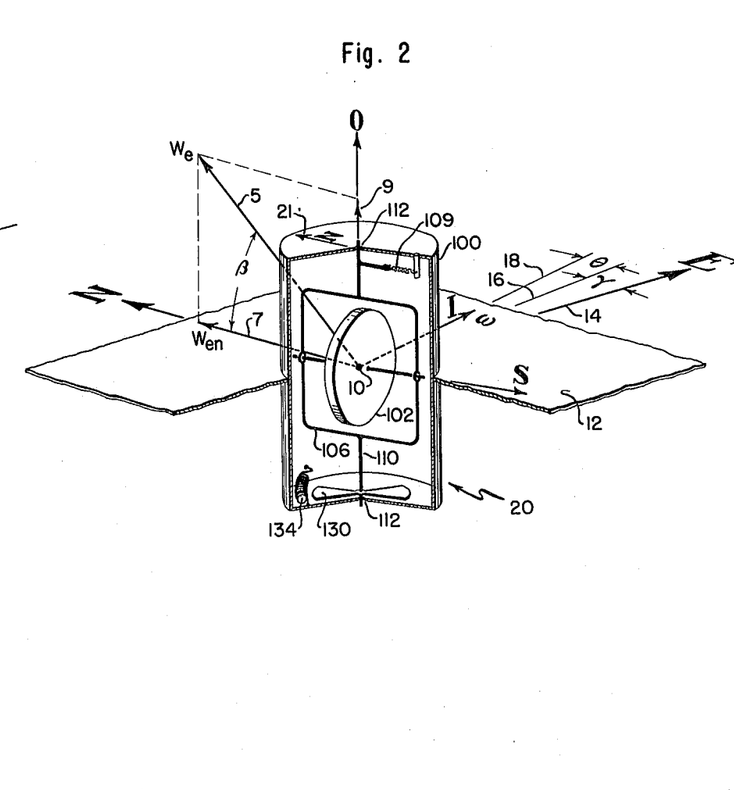

Referring now to FIG. 2, a horizontal plane on the earth's surface is shown at 12, and a single-degree-of-freedom gyro 20 is shown placed at the point 10. The gyro is shown as a simplified version of the unit of FIG. 6. It has been placed with its output axis O vertical, its spin axis initially south and its input axis initially east. The latter two axes are shown slightly deflected as explained below. The gyro case is shown schematically at 100, and its rotor 102 is mounted in the frame 106 which is free to rotate in its bearings 112. Elastic restraint means have been added to generate a torque resisting rotations of the inner member. The restraint means is shown schematically as a spring 109 attached to the case. The spring 109 is arranged to apply no torque to the frame 106 when the spin axis is in a certain zero or null position in the case, but applies an elastic restraining torque about the output axis whenever the spin axis is deflected in either direction, said torque being proportional to the deflection.

In the following equations, the earth rotation vector is represented by $W_e$, and its north component in the horizontal plane 12 by $W_{en}$. These two are separated by an angle $\beta$, which, it will be seen, is equal to the latitude. H will be used to indicate the angular momentum of the rotor 102 and $k$ the elastic constant of the spring means 109. The three axes S, I and O are mutually perpendicular.

The casing may be provided with an index mark, shown at 21 to indicate north. This defines the null position of the spin or input axes. When the spin axis S and the index 21 are both in the meridian plane, the input axis I being then along the east-west axis 14, the apparatus is then nulled, and the spring 109 applies no torque between the case and the gyro output shaft.

The gyro unit is placed at the point 10 and it is being rotated once a day about the axis $W_e$. In its true position, the gyro input axis lies along the east direction E. There is no rotation of the unit about its input axis I. To show the direction-sensitive properties of the gyro, let it be assumed that the entire unit is deflected from its true position by an angle $\gamma$; that is, the index 21 and the spin axis S are deflected from true north-south, both by the angle $\gamma$. The spring 109 may be assumed to be unstretched. The input axis I then initially lies along the line 16. A component of the angular velocity vector $W_e$ now lies along the gyro input axis I. It causes the gyro rotor to exert a gyrostatic torque about the output axis O of the gyro, causing the entire frame 106 to turn against the spring 109 and thus to deflect through an angle $\theta$ within the case. The input axis I then lies along the line 18, as shown.

The magnitude of $\theta$ is determined as follows: When the gyro comes to rest the output or gyrostatic torque $T_o$ is balanced by the spring torque $T_k$.

(1) $$T_o = T_k$$

The gyrostatic torque is the product of the rotor angular momentum H and the angular velocity $\omega$ of the gyro unit about its input axis, shown by the vector $\omega$. ($\omega$ is a component of $W_e$ or $W_{en}$ and, since $\gamma$ is small, is itself small but is shown exaggerated in FIG. 2.)

(2) $$T_o = H\omega$$

The spring torque is proportional to the deflection $\theta$ of the inner member 106 with respect to the case 100.

(3) $$T_k = k\theta$$

when the gyro is at equilibrium, (4) $$\theta = \frac{H}{k}\omega$$

The component $\omega$ of earth's rotation lying along the gyro input axis is a component of the vector $W_{en}$. From the geometry (5) $$\omega = W_{en} \sin(\theta + \gamma)$$

Again from geometry:

(6) $$W_{en} = W_e \cos \beta$$

(7) $$\omega = [W_e \cos \beta] \sin(\theta + \gamma)$$

For small angles:

(8) $$\omega = [W_e \cos \beta](\theta + \gamma)$$

(9) $$\theta = \frac{H}{k}[W_e \cos \beta](\theta + \gamma)$$

(10) $$\theta = \frac{\frac{H}{k}[W_e \cos \beta]}{1 - \frac{H}{k}[W_e \cos \beta]}(\gamma)$$

This shows that $\theta$, the deflection of the gyro in its case is a measure of the restraining torque and therefore of the gyrostatic torque which is proportional to the deflection of indicated north (21) from true north. The deflection of the gyro in its case, and therefore the difference between indicated and true north, is measured by the signal generator mounted around the output shaft of the gyro unit, shown at 130 and 131 in FIGS. 2 and 6.

The invention contemplates the use of servo means sensitive to the signal generator to rotate a "controlled member" (here represented by the case 100) until the signal, that is, the angle $\theta$, is nulled, when, as shown by (10) above, the angle $\gamma$ is brought to zero. The means by which a reflection from null is detected and the controlled member is driven are completely shown in the copending applications of Draper, Hutzenlaub and Woodbury, and Draper and Woodbury, Serial Nos. 216,946 and 216,947 respectively, filed March 22, 1951, now Patents Nos. 2,752,793 and 2,752,792, respectively, and will not be shown in detail here, but will be briefly described in connection with FIGS. 2 and 3.

As shown in FIGS. 2 and 6, on the gyroscope shaft 110 is mounted the rotor 130 of a pickoff or signal generator 131, the stator 132 of which is fixed to the case 100. This generator is preferably of the type described in the Mueller Patent No. 2,488,734, and generates an output voltage dependent on the deflection $\theta$. This voltage is fed through suitable amplifier and control circuits to drive a servomotor, which, so far as it concerns the equipment of FIG. 2, might be connected direct to the case 100 to turn the case back to a position in which the output voltage would be reduced to zero. This would therefore give a true indication of direction, since the index 21 would then point north. For a complete system, however, yaw control and vertical stabilization are also provided, and the servo connections are modified to include them, as will presently be described.

Before describing the controls for vertical and yaw stabilization, attention is directed to certain features of the gyro construction. A spring 109 has been diagrammatically shown as the elastic restraint member. For reasons of control and adjustment, a mechanical spring is not used, and an electrical elastic system is preferably used. This may take the form of the "spring" unit described in the above mentioned Mueller patent, but in the preferred form a torque generator contained in the gyro is used as described in the copending application of Draper, Serial No. 239,978, filed August 2, 1951, now Patent No. 2,752,790.

In brief, the apparatus described in that invention consists of a unit as shown in FIG. 6 and circuits connecting the output of the unit to its input. In FIG. 6, the gyro unit comprises three sections: (1) the gyro 101, comprising a rotor 102 and frame 106, (2) the signal generator 131, comprising a rotor 130, stator 132 and windings 134 and (3) a torque generator 141, comprising a rotor 140, stator 142 and windings 144. The torque generator stator and windings are connected to the case 100 and its rotor to the output shaft 110. When a current input is applied to the windings, the torque generator exerts a torque between its rotor and stator proportional to the current input. The signal generator output, which is proportional to the deflection, is connected back to act as the input to the torque generator. This provides the electrical equivalent of a spring: a torque proportional to the deflection of the shaft 110 resists deflection of the shaft. The output of the signal generator measures the deflection and therefore the restraining torque. Connecting circuits are required to amplify the small voltage output of the signal generator and change it to a current input for the torque generator. Referring to the azimuth gyro unit 20 of FIG. 4, the output of the signal generator 131 is passed to a pre-amplifier 114 and to a current generator 116 and back to the torque generator 141 to act as its input.

The actual construction of the gyro 100 is preferably of the floating type, as disclosed in the above-mentioned patent of Jarosh, Haskell and Dunnell. As shown schematically in FIG. 6, the gyro rotor and frame are preferably encased in a float 108 and the gyro case 100 filled with a viscous damping fluid, which both damps gyro rotations and floats the gyro assembly so as to lessen the load and shocks on the bearings 112. Furthermore, as explained in more detail in that application, the damping causes the signal generator output to be the time-integral of the torques about the shaft 110, that is, the time-integral of the sum of the torque generator torque and the gyro output torque. (This has no effect on the "spring" made by connecting the signal generator to the torque generator, except to introduce a slight delay in response.) The manner of mounting the signal generator 131 and the torque generator 141 is fully described in that application.

Figure 3:
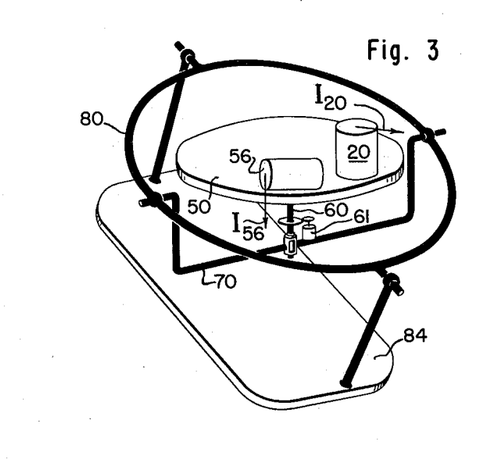
FIG. 3 is a schematic drawing showing the physical interrelation of the elements in one form of the direction-seeking system.

In FIG. 3 we show a yaw-stabilized gyrocompass according to the present invention. A controlled member shown as a table 50 is mounted in gimbals 70 and 80 to give it three degrees of freedom. It will presently be shown how the gimbals are controlled to maintain the table horizontal, but for present purposes horizontally of the table is assumed. The gyro 20, as previously described, is mounted on the table. Also mounted on the table is a yaw gyro unit 56. The servo drive motor is shown at 61 and, through suitable gearing, drives the vertical shaft 60 on which the table 50 is mounted. As will presently be shown, the drive motor 61 is under the joint control of the yaw gyro 56 and the azimuth gyro 20.

The part 84 represents the base on which the gyrocompass is mounted, namely, a part of the ship or aircraft.

The yaw gyro unit 56 is used to stabilize the controlled member 50 from yaw motions of the base 84. It is mounted on the table 50 with its input axis $I_{56}$ vertical as shown in FIG. 6. The yaw gyro unit is an integrating gyro, preferably of the type described in the above mentioned Jarosh, Haskell and Dunnell, Patent No. 2,752,971. For convenience, such a gyro unit is shown in some diagrammatic detail in FIG. 6 wherein the characteristic axes are designated O, I and S. It will be seen that if the preferred construction of FIG. 3 is used both the yaw gyroscope 56 and the azimuth gyroscope 20 may be of the same type, namely, that shown in FIG. 6. The gyro unit is placed vertically for use as an azimuth gyroscope and horizontally for use as a yaw gyroscope (see FIG. 3). By "the preferred construction" is meant an equivalent spring for the azimuth gyro 20 made by connecting the signal generator output to the torque generator input, and a drive means including yaw stabilization as described below. To indicate the similarity in construction between the yaw gyro unit 56 and the azimuth gyro unit 20, the reference characters in FIG. 4 associated with the components of the yaw gyro unit 56 have been made similar to those associated with the azimuth gyro unit 20, but greater by 100.

Figure 4:
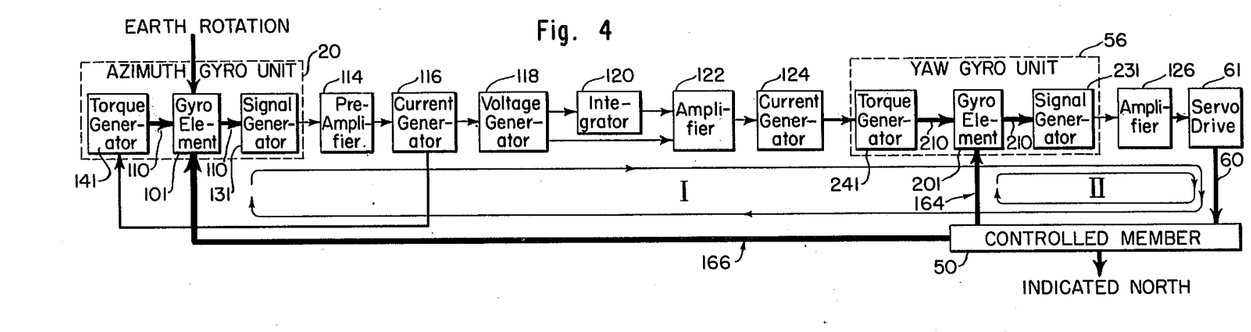
FIG. 4 is a block diagram showing the electrical and mechanical interrelation of the elements in the form of the direction-seeking system shown in FIG. 3.

The unit 56 is therefore a single-degree-of-freedom gyro of the preferred type in which the signal generator generates an electric signal voltage proportional to the rotation of the gyro element from a neutral position. As shown in FIG. 4, the signal from the signal generator 231 is used to control the operation of the servo motor 61. The torque generator 241 has applied to it a signal voltage fom the signal generator 131 of the azimuth gyro unit 20 in a manner which will presently be described.

The yaw gyro unit 56 is preferably substantially identical in its construction with the azimuth gyro unit 20, both as shown in FIG. 6, except that the input axis of the azimuth gyro is horizontal and that of the yaw gyro is vertical. The signal generator 231 is identical with the generator 131 and the torque generator 241 is identical with the generator 141 although it is used for an additional purpose. The purpose of the torque generator 141 of the azimuth gyro unit is to provide an elastic restraint for the unit, whereas the torque generator 241 in the yaw gyro unit is for the application of a reference or control torque by which the controlled member is maintained in a correct orientation.

The essentials of the process can be understood from a consideration of the block diagram of FIG. 4. In that drawing the configuration of FIG. 3 is more fully shown. In FIG. 4, rigid mechanical connections are shown by heavy lines; power level connections by medium lines and signal level connections by light lines. The diagram should be considered as comprising five sections. Two of these are the azimuth gyro unit 20 and the yaw gyro unit 56. The third is the servo drive 61 and its input amplifier 126 and the fourth is the controlled member 50. The fifth section of the diagram includes the signal modifying elements 114–124 which link the azimuth gyro unit to the yaw gyro unit. It is not necessary at this point to discuss their effect which will be explained below; it suffices to say here that the signal from the current generator 116 is proportional to the angular velocity sensed by the azimuth gyro which we have shown above is proportional to the deviation of the controlled member 50 from east.

When the gyro element 101 is deflected in the case of the azimuth gyro unit 20 by an angle θ, the signal generator 131 sends a signal through the section 114–124 to the torque generator 241 of the yaw gyro unit 56. When the yaw gyro element 201 is deflected, a signal from the generator 231 is transmitted through an amplifier 126 to the servo drive motor 61 which is connected through gearing with the vertical shaft 60 of the controlled member 50, as shown in FIG. 3.

The heavy lines 164 and 166 in FIG. 4 represent the rigid mountings of the cases of the respective gyroscopes on the controlled member 50 whereby, as the controlled member is turned toward or away from its true north position, the gyros are rotated in a manner to null or increase the deflections of the gyro units within their casings.

Two feedback loops are shown on the diagram, denoted I and II, which will be referred to as the signal loop and the servo loop, respectively. This is because the movements of the controlled member 50 act on both gyro units. Isolate for the moment the loop II by breaking loop I, as at the connection between the current generator 124 and the torque generator 241. It can then be seen that the effect of loop II is to hold the controlled member fixed in inertial space, that is to say, to isolate it from yaw movement of its supports. Loop II is exactly like the electromechanical loop shown in the Draper, Hutzenlaub and Woodbury patent above referred to, which stabilizes in inertial space. It suffices to say here that the gyro element 201 would then deflect in its case an amount proportional to the rotation of the controlled member with respect to inertial space about the input axis of the gyro ($I_{56}$ in FIG. 3). The signal generator 231 converts this deflection into a proportional electric signal which causes the servo drive 61 to rotate the controlled member 50 back so as to null the gyro deflection, thereby holding the controlled member fixed in inertial space.

If now the connection between the current generator 124 and torque generator 241 is restored, the latter acts on the output shaft 210 of the yaw gyro, thereby imposing a torque dependent on the deviation of the controlled member from east, tending to rotate the rotor of the signal generator 231.

Any rotation of the shaft and rotor activates the servo drive 61 which moves the member 50 and causes the gyro element 201 to be rotated (indicated by the arrow 164). A gyrostatic torque on the shaft 210 is therefore set up, proportional to the angular velocity of the member 50. Finally, the two torques balance and the shaft 210 stops deflecting when the angular velocity of the member 50 is proportional to the torque from the torque generator 241, and therefore to the current from the current generator 124. This current, (except for the integration effected in the integrator 120) is substantially proportional to the deviation of the controlled member and the axis $I_{20}$ from east. Therefore, the combined action of loops I and II is to cause the controlled member to track the east direction, and if it is deviated from east, to return to the east direction with a velocity proportional to its deviation. (As so far explained, there may be a lag in tracking east; this is substantially eliminated by the integrator 120, as will be explained below.) This combined loop operation is similar to that shown in the block diagram (FIG. 3) in the above mentioned Draper and Woodbury patent, where the control element of loop I is shown as a pendulum. A more detailed analysis of the above control process will be found in that patent.

It will be noted that, theoretically, loop II can be dispensed with. This can be seen by supposing that the gyro element 201 had stopped spinning; the servo drive 61 would still receive an error signal from the signal generator 231, determined by the torque from the generator 241, in turn determined by the deviation from east as determined by the azimuth gyro 20. It would make no difference whether the error signal was caused by yaw motion of the base 84 or by a displacement of the controlled member 50 from east. Hence, the controlled member 50 would still be held to east. However, practically, a great advantage is secured by using two loops and having each loop perform its function separately; the function of loop II is to isolate the east-seeking system from yaw motion of the base; the function of loop I is to hold the controlled member 50 to east. It is desirable to have loop II responsive to short-period motions of the ship or aircraft and therefore it must have a time constant of the order of a second or less. On the other hand, the time constant of loop I will be the settling time for the compass when the controlled member is moved away from east. This time will be dictated by considerations of sensitivity and stability. Consequently, as a practical matter, it is desirable to use two gyros, each to perform separate functions. The time constant of loop I is therefore relatively long, of the order of many minutes; and that of loop II is relatively short, of the order of one second. These values are determined by the parameters of the loops in a manner known to those skilled in the art.

The purpose of the electrical components 114–124 shown in FIG. 4, linking the azimuth gyro 20 to the yaw gyro 56, will now be explained. As was state above, it is preferable to use integrating gyros throughout, so as to facilitate manufacture. Therefore, the gyro unit 20 is connected as described above and in the Draper Patent No. 2,752,790 to make it rate-sensitive. Toward this end, the preamplifier 114 and current generator 116 are added as the means referred to in that patent to adapt the output of the signal generator 131 to act as the input of the torque generator 141. By such a connection the input to the voltage generator 118 is proportional to the deviation of the controlled member from east (see Equations 1–10 above. Such a connection has the same effect as the spring 109 of FIG. 2.

The voltage generator 118, the integrator 120 and amplifier 122 provide a direct channel for the gyro unit signal and an integrating channel in parallel with it. The integrating channel is provided so that there can be a continuous input to the yaw torque generator 241 without more than an infinitesimal deflection of the azimuth gyro element 101. As was explained above, the input axis of the yaw gyro unit 56 is fixed in space by the operation of loop II of FIG. 4. However, it is desired that this input axis be made continuously parallel to the east-west direction, a direction which is not fixed in space, but rotates as the earth rotates and as the gyrocompass is moved over the earth's surface. Therefore, the input axis of the yaw gyro unit 56 is continuously controlled or rotated by the torque generator 241 as explained above. In order for the torque generator to be continuously active, there must at all times be a signal from the current generator 124, and therefore, if only a direct channel were provided by the components 118 and 120, there would have to be at all times a signal output from the signal generator 131 of the azimuth gyro unit 20. This in turn would mean that the azimuth gyro element 101 would always have to be slightly deflected and that therefore, there would always be an error in the indication of north. By integrating the azimuth output signal, an input for the torque generator 241 is provided without any substantial deflection of the azimuth gyro element 101. To that end the integrator 120 is provided in parallel with the direct channel between the elements 118 and 122.

The current generator 124 is provided to adapt the output signal from the mixing amplifier 122 to actuate the torque generator 241.

Figure 5:
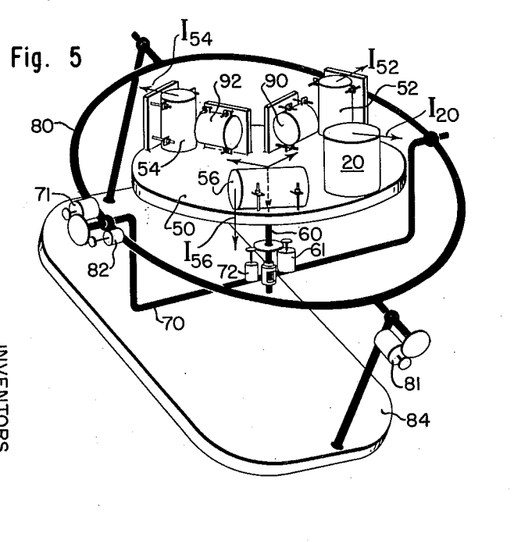
FIG. 5 is a schematic drawing of one form of the entire gyrocompass.

In FIG. 5 is shown a schematic drawing of one form of the gyrocompass as a whole. FIG. 5 is the same as FIG. 3 but with a system for stabilizing the controlled member 50 to the vertical. It is to be understood that any desired system of vertical stabilization may be used, but that the system shown in FIG. 5 is a preferred embodiment.

The vertical-stabilizing system of FIG. 5 is fully described in the copending application of Draper and Woodbury Patent No. 2,752,792 and to facilitate comparison, the reference characters of FIG. 5 are similar to those of FIG. 7 of that patent. One reason the system there described is preferred here is because it also makes use of single-degree-of-freedom gyros of the type shown in FIG. 6. These gyros 52 and 54 stabilize about X and Y axes, in the same way that the yaw gyro 56 stabilizes about a Z axis. The input axes of these gyros, $I_{52}$ and $I_{54}$ are controlled by pendulum units 90 and 92 in the same way that the azimuth gyro unit 20 controls the input axis of the yaw gyro unit 56. The pendulum units are single-degree-of-freedom pendulum units, that is, they are sensitive to forces about one axis only. That axis corresponds to the input axis of the gyro it controls, in the same way that the azimuth gyro unit detects the east direction about the input axis of the yaw gyro unit. The single-degree-of-freedom pendulums make use of a pendulous mass mounted on a shaft running the length of the cylindrical cases shown at 90 and 92.

The vertical is detected in the manner indicated in the copending application of Wrigley and Draper, Ser. No. 249,182, filed September 21, 1951, abandoned in favor of a continuation-in-part, Serial No. 549,917, filed November 30, 1955, now Patent No. 3,015,962, granted January 9, 1962. The pendulums, in essence, are sensitive to both gravity and the non-vertical accelerations of the base 84. The direction of the resultant acceleration, represented by an electrical output from the pendulum units, is time-integrated with appropriate sensitivities and damped, by the method there explained, so as to produce an electrical output which represents the rate of change of true vertical. This output is used to actuate torque generators in the gyro units, as described above. Thereby, the null position of the member 50 about the input axis of the gyros is made the horizontal plane.

At 61, 71 and 81 are shown the servo drives actuated by the gyros. They move the controlled member 50 so as to isolate it from base motion and to keep it horizontal. At 72 and 82 are shown angle resolvers by which the signal outputs of the gyros (proportional to deflections about the gyro input axes) are multiplied by trigonometric functions of the gimbal angles so the signals are proportional to deflections about the gimbal axes or servo axes.

A further refinement of the present invention may be made in which one gyro is eliminated. In FIG. 5, there are three gyro units 20, 52 and 54 that have their input axes horizontal; it is obvious that only two are needed to detect all rotational motion with respect to the horizontal plane defined by the axes $I_{20}$, $I_{52}$ and $I_{54}$. The refinement consists of making one of the horizontal-stabilizing gyro-pendulum loops (here, the Y-gyro 54 and Y-pendulum 92) act as the null detector of east.

The gyro 54 may be made to perform the function of gyro 20, and hence the gyro 20 may be eliminated. The feedback loop used to generate the resisting torque consists of the signal generator output from the gyro 54, the servos 71 and 81, the member 50, and the Y-pendulum unit 92, the signal output from the pendulum unit 92 is made to drive the torque generator of the Y-gyro 54. The input to the Y-gyro torque generator, being proportional to the torque, serves as the measure of the resisting torque and as the error signal to actuate the horizontal velocity drive.

Figure 7:
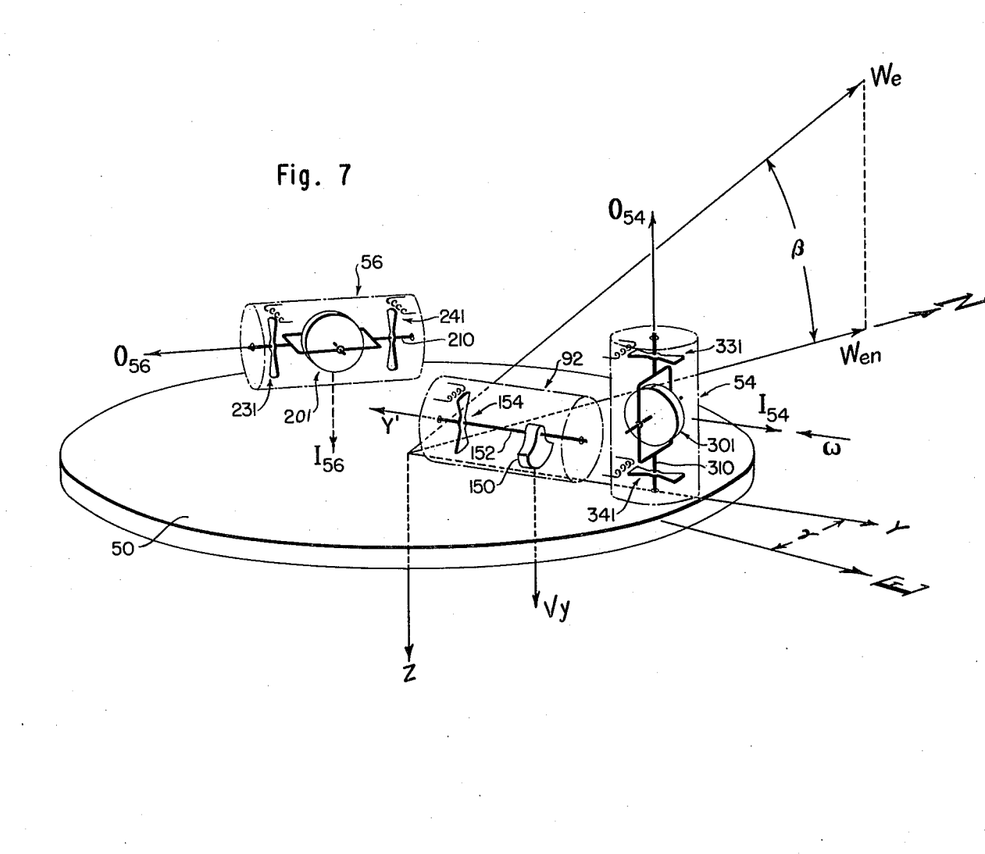
FIG. 7 is a schematic detail drawing of parts of a preferred embodiment and FIG. 8 is a block diagram of the electrical and mechanical components of FIG. 7.
Figure 8:
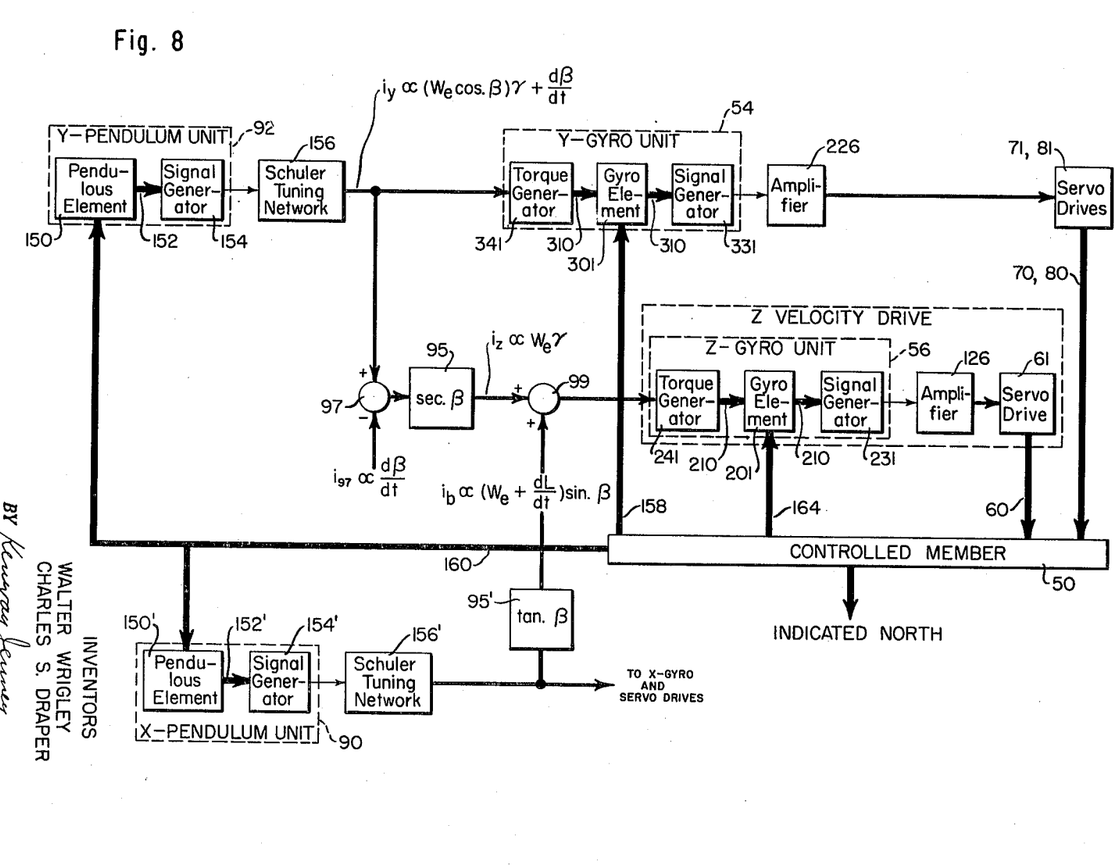

FIGS. 7 and 8 will be used to explain this mode of operation in more detail. FIG. 7 is a schematic diagram of the improvement on the configuration of FIG. 5 and FIG. 8 is a block diagram of the control loop associated with the pendulum unit 92 and the gyro-servo loops associated with the gyros 54 and 56.

Mounted on the controlled member 50 are the single-degree-of-freedom gyros 54 and 56. Each is preferably constructed like the unit of FIG. 6, that is, each containing a gyro element which responds to motion about its input axis by a rotation about its output axis, a signal generator converting deflections into signal outputs and a torque generator for converting an electric input into a torque to restrain the gyro element. The gyro 56 is placed horizontally as shown by the orientation of its axes $I_{56}$ and $O_{56}$; the gyro 54 is vertical as shown by $I_{54}$ and $O_{54}$. The gyros are shown with their gyro elements at 201 and 301 respectively. The gyro element consists of a rotor in a frame which is carried by a shaft (shown at 210 and 310) so it can deflect only about the shaft axis, denoted the output axis ($O_{54}$ and $O_{56}$). The gyro units are sensitive to motions about their input axes $I_{54}$ and $I_{56}$, perpendicular to the spin axes S and output axes. The signal generators 231 and 331 comprise rotors attached to the shafts 210 and 310 and stators and stator windings attached to the cases. A reference voltage induces an output voltage proportional to the rotor-stator or shaft-to-case deflection. The torque generators 241 and 341 comprise similar rotor-stator configurations and produce torques proportional to an electric input.

Also mounted on the member 50 is the Y pendulum unit 92. It comprises a case and bearings which support a shaft 152 on which a pendulum mass 150 is attached so that the pendulum swings by rotating the shaft. A signal generator 154 (preferably like the signal generator 130, 132, 134 of FIG. 6) converts shaft rotations into an electric signal. The pendulum has only one degree of freedom since it is responsive to the sum of forces on its bob about its shaft axis Y' only. The axis Y' is made as nearly the same as the Y axis of the member 50 as possible. The X-gyro and X-pendulum are not shown in FIG. 7, but it will be understood that so far as horizontalizing the member 50 is concerned, the X and Y loops are the same.

FIG. 8 shows the components of FIG. 7 in block form, their associated electrical components and the interrelation between them. Heavy lines indicate rigid mechanical connections, medium lines, power-level connections and light lines, signal-level connections. The signal output from the pendulum unit 92 is passed to a Schuler tuning network (to be described below) which produces an output $i_y$ proportional to $$(W_e \cos \beta)\gamma + \frac{d\beta}{dt}$$

This output is imposed on the torque generator 341 of the Y gyro and on the torque generator 241 of the Z gyro (through the components 95 and 97). Before the $i_y$ output is passed on to the Z gyro, there is subtracted from it by the mixing amplifier or other subtracting means 97 of latitude $$\frac{d\beta}{dt}$$

of the member 50. An angle resolver or other trigonometric-function generating means 95 multiplies the remaining component by sec. $\beta$.

The Y gyro 54 activates the servo drives 71 and 81 which are rigidly connected to the member 50 through the gimbals 70 and 80. Similarly the Z gyro 56 activates the Z servo 61 which is rigidly connected to the member 50 through the gimbal 60. The heavy arrows 158, 160 and 164 indicate the rigid mountings of the Y gyro 54, the Y pendulum unit 92 and the Z gyro 56, respectively, on the member 50.

The case will first be considered where the controlled member 50 is at a point on the earth of latitude $\beta$ and is motionless with respect to the earth. In such as case the pendulous mass 150 will hang to the true vertical about the Y' and Y axis, shown as $V_y$. (The Y axis is a reference axis on the member 50 which is parallel to the input axis $I_{54}$ of the gyro unit 54, when the gyro is undeflected.)

The member 50 is shown in FIG. 7 with its Y axis deflected by a small angle λ from the east direction E. Therefore, as explained above, a component ω of the earth's rotation $W_e$ lies along the Y axis or along the input axis $I_{54}$ of the gyro. This component is ($W_e$ cos β) λ, where β is the latitude, and it tends to rotate the gyro 54 and member 50 with respect to space.

The gyro element 301 therefore tends to deflect in its case. Any deflection causes the signal generator 331 to emit a signal to activate the servo drives 71 and 81 to rotate the member 50 about the Y axis. (When neither servo axis coincides with the Y axis, both servos are needed. The resolving process arranges the necessary servo combination, as described in the patent to Draper, Hutzenlaub and Woodbury cited above.) In the absence of any control from the pendulum, it can readily be seen that the gyro will rotate the member 50 at a rate equal and opposite to the rate it senses about its input axis. This is simply to say that the gyro-servo loop will hold the member 50 fixed in space about the Y axis.

The pendulum unit is provided to control the gyro so that the member 50 is not held fixed in space but fixed with respect to the earth. If the gyro were uncontrolled, it would cause the servo to turn the member 50 about the Y axis, with respect to the earth. Any such rotation is sensed by the pendulum and the pendulum output signal is used to activate the gyro torque generator 341 to bring the member 50 back to its horizontal position. This torque is the resisting torque which corresponds to the spring torque in FIG. 2 or the torque from the feedback loop in FIG. 4.

It will now be shown that this torque is proportional to the input angular velocity ω sensed by the gyro. An angular velocity ω of the gyro unit 54 about its input axis $I_{54}$ causes the gyro element 301 to generate a gyrostatic torque tending to rotate the shaft 310. This torque equals Hω, where H is the rotor angular momentum. The gyrostatic torque infinitesimally deflects the signal generator 331 which activates the servos to cause a rotation of the member 50 about the Y axis. For the signal to be nulled, the shaft 310 must be undeflected and therefore the torques on the shaft must balance. The servo rotation generates a counter gyrostatic torque by rotating the member 50. For this torque to null out the one due to ω, the rate of servo rotation must equal ω. In other words, the gyro-servo loop, if uncontrolled by the pendulum, holds the member 50 fixed in space by rotating it with respect to the earth at a rate equal and opposite to the rate of the earth with respect to space.

The pendulum unit 92 picks up this rotation of the member 50 with respect to the earth. Since the member 50 is otherwise motionless on the earth, the pendulum hangs to the true vertical about the Y' axis, shown as $V_y$. Its shaft-to-case-rotation is proportional to the total angle through which the member 50 is rotated by the servo. However, to enable the system to determine the true vertical in the presence of linear horizontal accelerations the output from the pendulum's signal generator 154 is modified by a Schuler-tuned network. This will be discussed in more detail below. It suffices to say here that integration is provided which modifies the pendulum unit output to make it proportional, not to the deflection, but to the angular velocity of deflection of the member 50 with respect to the horizontal. This, as was explained above, is the servo rotation and is proportional to ω. Therefore the modified pendulum output is proportional to ω.

The modified pendulum output, proportional to ω, is used to generate a torque by means of the gyro torque generator 341. This torque deflects the gyro back through its zero point until the position of the member 50 with respect to $V_y$ is the same as it formerly was.

Visualized as continuous operation, the input angular velocity ω generates a gyrostatic torque tending to deflect the gyro signal generator 331. Any such deflection activates the servos to move the member 50 which causes the pendulum to generate a zeroing torque equal and opposite to the gyrostatic torque. There is a feedback loop comprising the signal generator 331, the servo drives, the member 50, the pendulum unit 92, is Schuler-tuned network and the gyro torque generator 341, and the net effect of the loop is to generate a measureable resisting torque equal and opposite to the gyrostatic torque, just like the spring 109 of FIG. 2 or the loop (131, 114, 116, 141) of FIG. 4.

The input to the torque generator 341 is thus a measure of ω. ω itself equals ($W_e$ cos β)γ, so the input is also a measure of γ, the deviation from east. This input is used to activate a servo drive to rotate the member 50 about its Z axis to null γ. As explained above it is desirable to move the member 50 with a velocity proportional to γ, so as to minimize lags and dynamic errors.

This is most conveniently done through the use of the yaw or Z gyro 56, by the process described above. The error signal, proportional to γ, tends to deflect the gyro element 201 by means of the torque generator 241. The servo drive 61 is activated to move the member 50 at a velocity such as to null the gyro deflection, i.e., to generate a gyrostatic torque equal and opposite to the torque generator torque. Thus, the member 50 is horizontally rotated at a velocity proportional to γ until γ is reduced to substantially zero.

The embodiment of FIG. 7 has been discussed in the special situation where the member 50 is not moving on the earth's surface. Such motion may be of two types, translation and rotation, of the base 84. The stabilization action of the gyro-servo loops isolates the member 50 from rotational motion of the base 84. It is to be understood that the direction-seeking aspects of operation are superimposed on the basic stabilization process, and in no way interfere with this operation. As explained above, the period of the base motion isolation loops is of the order of a second, while the periods of the control loops (orienting the member 50 to the horizontal or the east) are of the order of an hour.

Translation of the base 84 has three effects. First, as can be seen from FIGS. 1 and 2, a north-and-south motion will introduce an angular velocity about the east axis of the member 50 which will throw the null velocity point off from the true east. This northerly error is common to all gyrocompasses and must be compensated for in the embodiments of FIGS. 2, 4 and 8. In the present invention, the error signal proportional to the resisting torque in the east-seeking gyro element will contain a component due to a deviation from east, and a component due to north-and-south motion $$\frac{d\beta}{dt}$$

The sum of these two components represents the total gyrostatic torque or its equal resisting torque and is proportional to the total input angular velocity sensed by the gyro. The angular velocity due to northward motion is the northerly speed divided by the earth's radius. This quantity can be obtained from water-speed measurements and an electric quantity generated of the proper magnitude to be subtracted from the error signal. In the embodiments of FIGS. 2 and 4, this is most conveniently done at the input to the voltage generator 118.

In FIG. 8, the signal from the Y pendulum unit 92, after being operated on by the Schuler tuning network 156 comprises the error signal which is made to act on the Z-gyro torque generator 241. It is from this signal that the northerly error is subtracted. A quantity proportional to the rate of change of latitude is generated elsewhere in the system and subtracted from the error signal by the mixing amplifier or other component 97.

The second effect of translation of the base 84 is to cause the value of $\beta$ to change in the expression for the error component of angular velocity $(W_e \cos \beta)\gamma$. It is desirable to have an error signal which is proportional to the error angle by the same constant at all points on the earth's surface. Therefore, it is desirable to multiply the error signal (after correcting it for northerly error) by sec. $\beta$. This quantity can be obtained from an angle resolver or by other means which are well known to those skilled in the art. Such means are indicated by the component 95, producing an input $i_Z$ to the Z-gyro torque generator 241 which is proportional to $W_e\gamma$.

The third effect of translation of the base 84 is to produce acceleration forces on the pendulum bob 150 which cause it to hang away from the true vertical $V_y$. The pendulum deflection is a measure of the direction of the resultant of the gravity and inertia forces on its bob. This deflection, represented by an electric output from the signal generator 154 is used to detect the direction of true vertical. It can readily be seen that double integration of this quantity with appropriate sensitivities will be proportional to the distance travelled by the base 84 over the earth's surface, and therefore proportional to the change in direction of the true vertical. Knowledge of the change in the vertical enables the system to reorient the member 50 continuously so it will be horizontal at all times.

One of these integrations is performed by the Y gyro-servo loop. As was pointed out above, the loop acts as a velocity drive, moving the member 50 through an angle proportional to the time-integral of the current input to the Y-gyro torque generator 341.

The Schuler tuning network provides the other integration. In general this network will include amplifiers and an integrator. The integrator is preferably by-passed by a direct channel, like the integrator 120 of FIG. 4, to provide system damping. The output of the Schuler tuning network is therefore substantially proportional to the time-integral of the accelerations sensed by the pendulum, which is the Y angular velocity of the platform 50, with respect to the earth $$\left(\frac{d\beta}{dt}\right)$$

plus the platform angular velocity with respect to space necessary to keep the platform horizontal, $(W_e \cos \beta)\gamma$. The condition of Schuler tuning provides components with appropriate system constants so that this indication of true vertical is substantially free or errors due to horizontal accelerations. For a more detailed description of the preferred method and apparatus for Schuler tuning, attention is called to the above mentioned copending application of Wrigley and Draper, filed, September 21, 1951, No. 249,182 and Patent No. 3,015,962.

One further ramification remains to be explained, namely, the introduction of a "booster velocity signal" on the Z-gyro. In the embodiments where a Z-gyro-servo loop is used as the velocity drive responsive to the error signal to line the controlled member 50 up to east, the signal has been sufficient to drive the controlled member with a correction angular velocity with respect to the earth. No account has been taken of the signal necessary to drive the member with respect to space as the earth rotates.

In other words, the Z-gyro-servo loop, if no input current is applied, holds the member 50 fixed in space about the Z-axis. The Z-gyro-servo loop moves the member at a velocity with respect to space proportional to its input current. We have shown above how an input current is generated (from the direction-seeking gyro) sufficient to drive the member with respect to the meridian plane so it is lined up with east. It has not been shown how an input current is generated to move the member 50 with the meridian plane as the meridian plane rotates in space.

The rotation of the meridian plane in space has two components, the first due to earth rotation in space, the second due to vehicle motion around the earth's polar axis. Referring to FIG. 1, both these rotations take place about the polar axis 3. The first is the earth's rotation $W_e$, the second is the rate of change of longitude $$\frac{dL}{dt}$$

The Z-gyro's input axis lies along the vertical 9 (FIGS. 1 and 7) and the components of these two rotations which the Z-gyro senses are:

$$\left(W_e + \frac{dL}{dt}\right) \sin \beta$$

Therefore, an input current to the Z-gyro must be generated which is proportional to $$\left(W_e + \frac{dL}{dt}\right) \sin \beta$$

This current is in addition to the current which drives the Z-gyro to line the member 50 up to east, that is, to compensate for rotations of the vehicle with respect to the meridian plane. That current is proportional to $W_e\gamma$, as described above.

The system as shown will derive such a current from the direction-seeking system by letting an error persist which generates the current proportional to $$\left(W_e + \frac{dL}{dt}\right) \sin \beta$$

That is, the gyro 20 (FIG. 4) or the gyro 54 (FIGS. 7 and 8) will be enough off east so as to generate this current. The error in azimuth so introduced will usually be less than ½° which is accurate enough for many installations.

However, this error may be substantially eliminated by the addition of a "booster velocity signal." That is, there need be no direction error if this current proportional to $$\left(W_e + \frac{dL}{dt}\right) \sin \beta$$

is derived somewhere else in the system. It should be noted that the current need not be highly accurate since current enough to balance out any errors in the booster signal will be derived from the directional system (gyro 20 or gyro 54). In short, the "booster velocity signal" causes the gyro-servo loop to rotate at about the right rate; the direction-seeking gyro keeps the member 50 lined up to east.

There are a number of ways of deriving such a booster signal (shown as $i_b$ in FIG. 8). The simplest is to generate it by a separate electrical system which generates a current proportional to $W_e$ and includes an angle resolver to multiply the signal by $\sin \beta$. The angle resolver is set sufficiently accurately if the latitude is set in once or twice a day. The booster signal is then substantially proportional to $W_e \sin \beta$ and is presumably within about 5% of the above prescribed value.

The method shown in FIG. 8 is to tap off the current from the X pendulum unit 90 to the X gyro unit 52. The X pendulum and X gyro keep the member 50 horizontal about the X axis. The X pendulum, Schuler tuned, generates an input current to the X gyro which causes the X gyro-servo loop to rotate the member 50 in space with a velocity proportional to the input current. It can readily be seen that this current is proportional to $$\left(W_e + \frac{dL}{dt}\right) \cos \beta$$

(since that is the necessary velocity of the member 50 around the axis $I_{52}$ with respect to space to keep it horizontal). Multiplying this by $\tan \beta$ gives the desired booster signal. Tan $\beta$ may be derived from a hand-set angle resolver as described above, or from a latitude detector as described in the copending application of Wrigley, Houston and DeLisle Serial No. 414,338, filed March 5, 1954, now Patent No. 2,953,858. Means for obtaining tan β are shown generally at 95'. The signal thus obtained is mixed with $i_z$ in the mixer 99 to form the input to the torque generator 241.

A third method is to integrate the signal from the Y-pendulum unit 92, that is, the signal in FIG. 8 which is in the connection from member 156 to member 97. This gives a permanent signal of the required value with only a transient error in the direction-seeking loop. However, since the Schuler tuning system already has integrated this signal twice (once to obtain a velocity signal, once for damping), there may be a condition of instability if this integration method is used.

It is to be understood that the present invention is not to be limited to the use of gyro-servo drives as shown. The signal from the direction-detecting gyro may be used to activate any means for moving the member attached to the gyro until that signal is nulled, such as an ordinary servo drive. The inclusion of the second gyro (the Z or yaw gyro unit 56) in the nulling means is not to be construed as limiting the invention to the use of two gyros; the addition of the second gyro is for the purpose of adding the feature of short-period stabilization about the east-west direction; it is not essential to the basic operation of the invention, namely, direction-seeking.

It is to be further understood that the present invention is not limited to the use of a gyro unit of the particular type shown in FIG. 6, or described in the Jarosh, Haskell and Dunnell Patent No. 2,752,791. The features of the gyro that are important are: (1) that it be a single-degree-of-freedom gyro, (2) that it be adaptable to provide an electric or mechanical signal output dependent on its deflection and (3) that it be adaptable to receive a measurable torque resisting deflections.

It is to be further understood that the invention is not to be limited to the use of pendulums for detecting horizontal accelerations; with slight changes in the configuration linear accelerometers may be used. In the following claims the term "gyrostatic torque" refers to the gyro reaction torque that tends to rotate the gyro in its mounting and that is derived from the angular momentum of the rotor in response to an angular velocity of rotation of the gyro about its input axis. The term "resisting torque" refers to a torque that tends normally to resist deflections due to the gyrostatic torque and that is imposed in the gyro by means external to the gyro rotor.

Having thus described our invention, we claim:

1. A gyrocompass comprising a controlled member, means for mounting the controlled member for orientation about three axes, three single-degree-of-freedom gyroscopes (denoted the X, Y and Z gyros) mounted on the controlled member with their input axes normally mutually perpendicular and the X and Y axes normally horizontal, signal-generating means for generating three output signals each substantially proportional to the deflection of one of the gyros, torque-generating means for generating three torques each tending to deflect one gyroscope, the amount of each torque depending on an electric input, servo means responsive to the three output signals to move the controlled member until the signals are nulled, pendulum means mounted on the controlled member for detecting the sum of the gravity force and the inertia reaction forces about axes X' and Y' substantially the same as the X and Y gyro input axes, means including signal generating means, amplifier means and integrator means for adapting pendulum deflections about the X' and Y' axes from null positions with respect to the controlled member vertical axis to generate electric inputs for the X and Y torque-generating means, means adapting the input to the Y torque-generating means to act as the input to the Z torque-generating means, and means for subtracting from the Z torque generating means input the component of that input due to a north-and-south velocity of the controlled member.

2. A gyrocompass comprising a controlled member, means for mounting the controlled member for orientation about three axes, three single-degree-of-freedom gyroscopes (denoted the X, Y and Z gyros) mounted on the controlled member with their input axes normally mutually perpendicular and the X and Y axes normally horizontal, signal-generating means associated with each gyroscope for generating output signals substantially proportional to the deflections of each of the gyros, torque-generating means associated with each gyroscope for generating torques tending to deflect each of the gyroscopes, the amount of each torque depending on an electric input, servo means responsive to the three output signals to move the controlled member until the signals are nulled, pendulum means mounted on the controlled member for detecting the sum of the gravity force and the inertia reaction forces about axes X' and Y' substantially the same as the X and Y gyro input axes, means including signal generating means, amplifier means and integrator means for adapting pendulum deflections about the X' and Y' axes from null positions with respect to the controlled member vertical axis to generate electric inputs for the X and Y torque-generating means, and means adapting the input to the Y torque-generating means to act as the input to the Z torque-generating means.

3. A gyrocompass comprising a controlled member, means for mounting the controlled member for orientation about three axes, three single-degree-of-freedom gyroscopes (denoted the X, Y and Z gyros) mounted on the controlled member with their input axes normally mutually perpendicular and the X and Y axes normally horizontal, signal-generating means for generating three output signals each substantially proportional to the deflection of each of the gyros, torque-generating means associated with each gyroscope for generating torques tending to deflect each of the gyroscopes, the amount of each torque depending on an electric input, servo means responsive to the three output signals to move the controlled member until the signals are nulled, pendulum means mounted on the controlled member for detecting the sum of the gravity force and the inertia reaction forces about axes X' and Y' substantially the same as the X and Y gyro input axes, means including signal generating means, amplifier means and integrator means for adapting pendulum deflections about the X' and Y' axes from null positions with respect to the controlled member vertical axis to generate electric inputs for the X and Y torque-generating means, means adapting the input to the Y torque-generating means to act as the input to the Z torque-generating means, and means for adding to the input to the Z torque-generating means a component proportional to the sum of the earths angular velocity and the rate of change of longitude about the Z axis.

4. A gyrocompass comprising a controlled member, means for mounting the controlled member for orientation about three axes, three single-degree-of-freedom gyroscopes (denoted the X, Y and Z gyros) mounted on the controlled member with their input axes normally mutually perpendicular and the X and Y axes normally horidontal, signal-generating means for generating three output signals each substantially proportional to the deflection of each of the gyros, torque-generating means associated with each gyroscope for generating torques tending to deflect each of the gyroscopes, the amount of each torque depending on an electric input, servo means responsive to the three output signals to move the controlled member until the signals are nulled, pendulum means mounted on the controlled member for detecting the sum of the gravity force and the inertia reaction forces about axes X' and Y' substantially the same as the X and Y gyro input axes, means including signal generating means, amplifier means and integrator means for adapting pendulum deflections about the X' and Y' axes from null positions with respect to the controlled member vertical axis to generate electric inputs for the X and Y torque-generating means, means adapting the input to the Y torque-generating means to act as the input to the Z torque-generating means, means for subtracting from the Z torque generating means input the component of that input due to a north-and-south velocity of the controlled member, and means for adding to the input to the Z torque-generating means a component proportional to the sum of the earth's angular velocity and the rate of change of longitude about the Z axis.

5. A gyrocompass comprising a controlled member, means for stabilizing the controlled member in a horizontal plane, a single-degree-of-freedom yaw gyroscope and a single-degree-of-freedom azimuth gyroscope both mounted on the controlled member, the yaw gyroscope having a vertical input axis to detect yaw motions of the controlled member and the azimuth gyroscope having its input axis in the horizontal plane to detect a component of earth's rotation when its input axis is not aligned to east, means operated by an output deflection of the azimuth gyroscope to apply to the yaw gyroscope about its output axis a torque of a magnitude corresponding to said output deflection, said last named means including integration and damping, and servo means operated by an output deflection of the yaw gyroscope to rotate the controlled member about a vertical axis.

6. A gyrocompass comprising a controlled member, means for stabilizing the controlled member in a horizontal plane, a single-degree-of-freedom yaw gyroscope and a single-degree-of-freedom azimuth gyroscope both mounted on the controlled member, the yaw gyroscope having a vertical input axis to detect yaw motions of the controlled member and the azimuth gyroscope having its input axis in the horizontal plane to detect a component of earth's rotation when its input axis is not aligned to east, a signal generator for each gyroscope to generate a signal of a magnitude corresponding to an output deflection of its corresponding gyroscope, a torque generator to apply a torque to the yaw gyroscope about its output axis, a signal loop from the signal generator of the azimuth gyroscope to the torque generator of the yaw gyroscope, and a servo loop including the signal generator of the yaw gyroscope to rotate the controlled member about a vertical axis in a direction to null output deflections of the yaw gyro, said signal loop being of materially longer period than the servo loop.

7. A combined gyrocompass and vertical indicator comprising a controlled member, means for maintaining a normally vertical reference axis for the controlled member, means for rotating said member about the vertical axis, yaw-detecting gyroscopic means including a single-degree-of-freedom gyroscope sensitive to motion about a vertical axis, signal generating means and torque generating means for said yaw-detecting gyroscopic means, a servo loop actuated directly from said signal generating means to drive the controlled member about the vertical axis, a single-degree-of-freedom azimuth gyroscope on the controlled member with its input axis normally horizontal and in the east direction, a signal generator for the azimuth gyroscope, and a drive loop for the controlled member including said signal generator for the azimuth gyroscope and the controlled member, said drive loop having a long period compared to the period of the servo loop.

8. A combined gyrocompass and vertical indicator comprising a controlled member, means for maintaining a normally vertical reference axis for the controlled member, means for rotating said member about the vertical axis, three single-degree-of-freedom gyroscopes mounted on the controlled member with their input axes mutually perpendicular and including an azimuth gyroscope having its input axis normally in the horizontal plane and aligned to the east direction, signal generating means for each gyroscope, servo means responsive to signals from the signal generating means to move the controlled member to null the signals, acceleration-detecting means on the controlled member and having signal generators, integrating and damping means to adapt signals from the acceleration detecting means to act as an input to the gyroscopes.

9. A combined gyrocompass and vertical indicator comprising a controlled member, means for maintaining a normally vertical reference axis for the controlled member, means for rotating said member about the vertical axis, three single-degree-of-freedom gyroscopes mounted on the controlled member with their input axes mutually perpendicular, one of said gyroscopes being sensitive to motion about a vertical axis and another having its input axis normally horizontal and east-seeking, acceleration-detecting means sensitive to gravity and interia reaction forces, gimbals in which the controlled member is mounted, servo means operated by the gyroscopes to drive the gimbals to maintain vertical and azimuth reference directions by the controlled member, connections between the acceleration-detecting devices and said gyroscope which is sensitive to motion about a vertical axis, said connections including integrating and damping means to provide a period which is long compared to the period of the servo means.

10. A compass apparatus comprising a base subject to rotative movement in space; motor means on said base and including a part adapted to be rotated about a first axis when said motor means is actuated; a single degree of freedom gyroscope having a spin axis, a single output axis, and a single input axis, said gryroscope including a signal generator responsive to gyroscopic precessive movement about said output axis and adapted to produce a signal as a function of movement about said output axis away from a normal position in which said signal is at a null, said gyroscope also including a damping means associated with said output axis; means mounting said gyroscope on said rotatable part so that said input axis lies in a plane perpendicular to said first axis when said signal is at a null, said gyroscope responding to rotative movement of said base structure about any axis wherein a component of said rotative movement is imparted about said input axis; and means including circuit means connecting said signal generator to said motor means so that said motor means is actuated upon precessive movement of said gyroscope about said output axis to cause rotation of said rotatable part and said gyroscope mounted thereon to a position about said first axis whereat said component of rotative movement imparted about said input axis is reduced to zero.

11. A compass apparatus including a base structure adapted to mount said apparatus on any object subject to rotative movement in space with which it is to be associated, said base structure including a part which is rotatable with respect to the remainder of the base structure and adjustable means carrying said part and adapted to position said part relative to the remainder of the base structure about a pair of axes perpendicular to one another and normally perpendicular to the axis of rotation of said part, motor means connected to said part and said base structure to provide said relative rotatable movement, a single degree of freedom gyroscope having a spin axis, a single output axis and a single input axis, said gyroscope including a signal generator responsive to gyroscopic precession about said output axis and damping means associated with said output axis, said signal generator responsive to gyroscopic processive movement about said output axis away from a normal position in which said signal is at a null means mounting said gyroscope on said rotatable part of said base structure such that the input axis is perpendicular to the rotation axis of said part, said gyroscope responding to rotative movement of said base structure where at least a component of said movement is applied to the input axis of the gyroscope to cause gyroscopic precessive movement about the output axis thereof, and circuit means connecting said signal generator to said motor of said part on said base structure to control the energization of the same and cause rotation of said part and said gyroscope thereon to bring the input axis of the gyroscope to a position in which the component of rotative movement imparted about said input axis is zero.

12. A compass apparatus including a base structure adapted to mount said apparatus on any object subject to rotative movement in space with which it is to be associated, said base structure including a part which is rotatable with respect to the remainder of the base structure, and adjustable means carrying said part and adapted to position said part relative to the remainder of the base structure about a pair of axes perpendicular to one another and normally perpendicular to the axis of rotation of said part, motor means connected to said part and said base structure to provide said relative rotatable movement, a single degree of freedom gyroscope having a spin axis, a single output axis and a single input axis, said gyroscope including a signal generator responsive to gyroscopic precession about said output axis, said signal generator responsive to gyroscopic precessive movement about said output axis away from a normal position in which said signal is at a null means mounting said gyroscope on said rotatable part of said base structure such that the input axis is perpendicular to the rotation axis of said part, said gyroscope responding to rotative movement of said base structure where at least a component of said movement is applied to the input axis of the gyroscope to cause gyroscopic precessive movement about the output axis thereof, and circuit means connecting said signal generator to said motor of said part on said base structure to control the energization of the same and cause rotation of said part and said gyroscope thereon to bring the input axis of the gyroscope to a position in which the component of rotative movement imparted about said input axis is zero.

13. A compass apparatus including a base structure adapted to mount said apparatus on any object subject to rotative movement in space with which it is to be associated, said base structure including a stationary part and a rotatable part which is rotatable relative to the stationary part about a first axis, the remainder of said base structure including a gimballing structure mounted on said stationary part and mounting said rotatable part for movement about a pair of axes perpendicular to one another and normally perpendicular to the first named axis, means mounted on and connected to said gimballing structure to stabilize said rotatable part in a horizontal plane, motor means connected between the rotatable part and the gimbal structure to provide for the rotative relative movement of said part about said first axis, a single degree of freedom gyroscope having a spin axis, and a single output and a single input axis, said gyroscope including a signal generator responsive to gyroscopic precessive movement about said output axis and a damping means associated with the output axis, said signal generator responsive to gyroscopic precessive movement about said output axis away from a normal position in which said signal is at a null means mounting said gyrscope on said rotatable part of said base structure such that said spin axis is normally in a vertical plane said gyroscope responding to rotative movement of said base structure about an axis such that a component of said movement is imparted to said input axis to cause gyroscopic precessive movement about said output axis, and means including circuit means connecting said signal generator to said motor of said rotatable part to drive said rotatable part and said gyroscope and bring the input axis of the gyroscope to a position in which the component of rotative movement imparted about said input axis is zero.

14. A compass apparatus including a base structure adapted to mount said apparatus on any object subject to rotative movement in space with which it is to be associated, said base structure including a stationary part and a rotatable part which is rotatable relative to the stationary part about a first axis, the remainder of said base structure including a gimballing structure mounted on said stationary part and mounting said rotatable part for movement about a pair of axes perpendicular to one another and normally perpendicular to the first named axis, means mounted on and connected to said gimballing structure to stabilize said rotatable part in a horizontal plane, motor means connected between the rotatable part and the gimbal structure to provide for the rotative relative movement of said part about said first axis, a single degree of freedom gyroscope having a spin axis, and a single output and a single input axis, said gyroscope including a signal generator responsive to gyroscopic precessive movement about said output axis and a damping means associated with the output axis, said signal generator responsive to gyroscopic precessive movement about said output axis away from a normal position in which said signal is at a null means mounting said gyroscope on said rotatable part of said base structure such that said spin axis is normally in a vertical plane, said gyroscope responding to rotative movement of said base structure about an axis such that a component of said movement is imparted to said input axis to cause gyroscopic precessive movement about said output axis, means including circuit means connecting said signal generator to said motor of said rotatable part to drive said rotatable part and said gyroscope and bring the input axis of the gyroscope to a position in which the component of rotative movement imparted about said input axis is zero and torquer means included in said gyroscope and adapted to apply torque about the output axis to modify the precessive movement.

15. A compass apparatus including a base structure adapted to mount said apparatus on any object subject to rotative movement in space with which it is to be associated, said base structure including a stationary part and a rotatable part which is rotatable relative to the stationary part about a first axis, the remainder of said base structure including a gimballing structure mounted on said stationary part and mounting said rotatable part for movement about a pair of axes perpendicular to one another and normally perpendicular to the first named axis, means mounted on and connected to said gimballing structure to stabilize said rotatable part in a horizontal plane, motor means connected between the rotatable part and the gimbal structure to provide for the rotative relative movement of said part about said first axis, a single degree of freedom gyroscope having a spin axis, a single output and a single input axis, said gyroscope including a signal generator responsive to gyroscopic precessive movement about said output axis and a damping means associated with the output axis, means mounting said gyroscope on said rotatable part of said base structure such that said spin axis is normally in a vertical plane, said gyroscope responding to rotative movement of said base structure about an axis such that a component of said movement is imparted to said input axis to cause gyroscopic precessive movement about said output axis, a second single degree of freedom gyroscope mounted on said rotatable part of said base structure and having input, output and spin axes with its input axes normally positioned parallel to the rotatable axis of said part, a torquer and signal generator included on the output axis of said second gyroscope, circuit means connecting said signal generator of the first named gyroscope to the torquer of said second gyroscope to slave the latter to the former, and further circuit means connecting said signal generator of said second gyroscope to the motor on said rotatable part to cause rotation of said part with output from said second gyroscope.

(References on following page)

References Cited in the file of this patent

UNITED STATES PATENTS

| | | |
|---|---|---|
| 1,501,886 | Abbott | July 15, 1924 |
| 1,930,082 | Boykow | Oct. 10, 1933 |
| 1,950,517 | Bawlings | Mar. 13, 1934 |
| 2,008,058 | Boykow | July 16, 1935 |
| 2,046,998 | Boykow | July 7, 1936 |
| 2,208,207 | Boykow | July 16, 1940 |
| 2,411,087 | Ford et al. | Nov. 12, 1946 |
| 2,591,697 | Hays | Apr. 8, 1952 |
| 2,606,448 | Norden et al. | Aug. 12, 1952 |
| 2,638,288 | Hanna | May 12, 1953 |
| 2,752,792 | Draper et al. | July 3, 1956 |
| 2,902,772 | Ciscel | Sept. 8, 1959 |